UNITED STATES PATENT OFFICE.

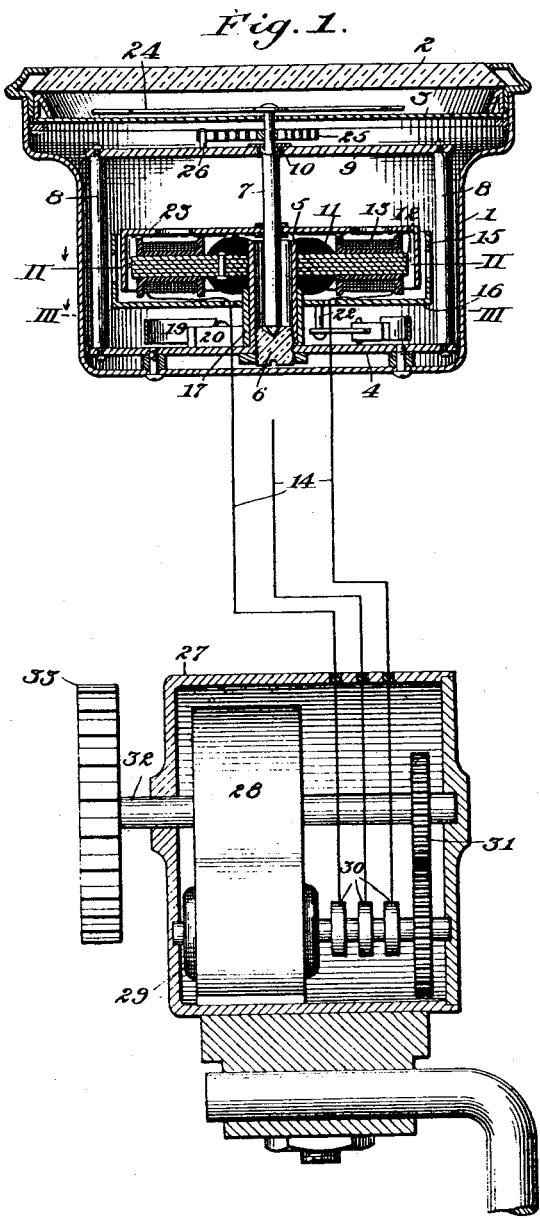

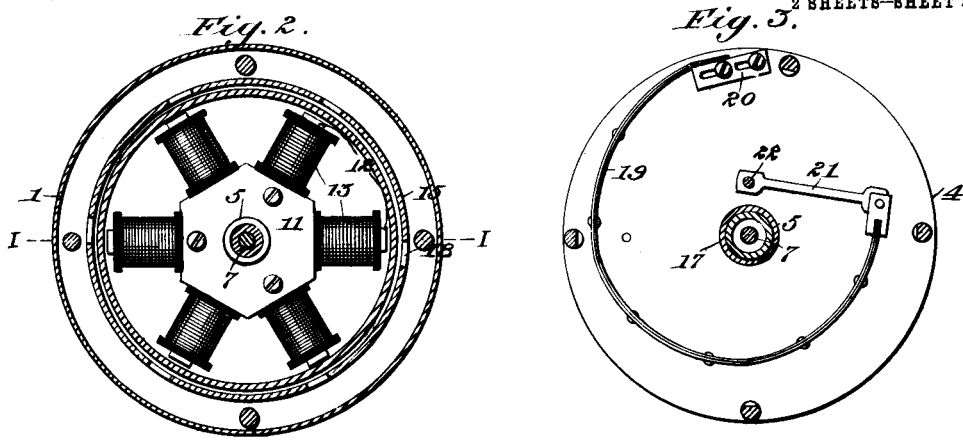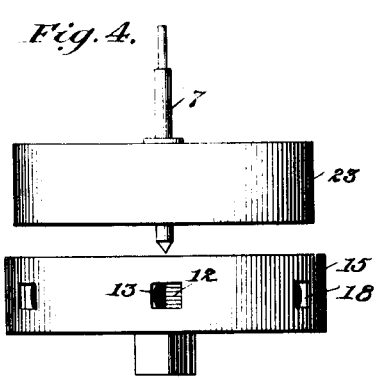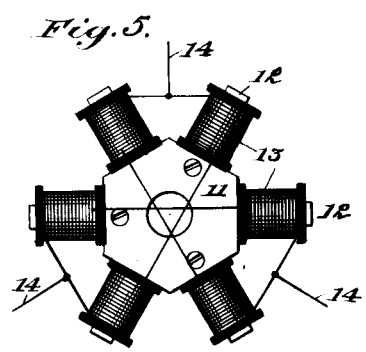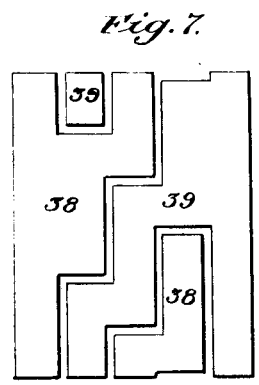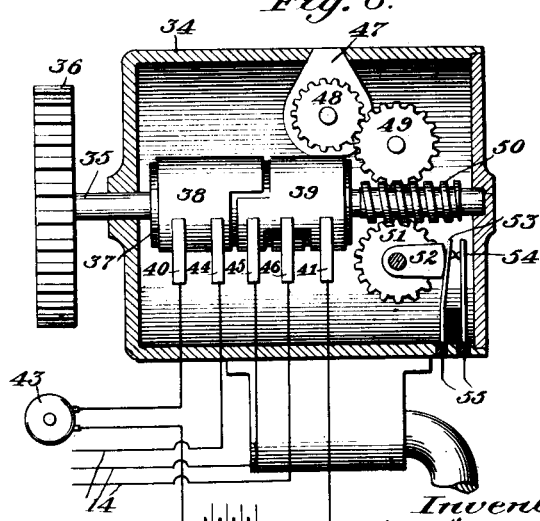

NEVIL MONROE HOPKINS, OF WASHINGTON, DISTRICT OF COLUMBIA, ASSIGNOR, BY MESNE ASSIGNMENTS, TO THE ELECTRIC TACHOMETER COMPANY, OF PHILADELPHIA, PENNSYLVANIA, A CORPORATION OF NEW JERSEY.

ELECTROMAGNETIC TACHOMETER.

1,055,911.      Specification of Letters Patent.      Patented Mar. 11, 1913.

Application filed January 19, 1911. Serial No. 603,510.

*To all whom it may concern:*

Be it known that I, NEVIL MONROE HOPKINS, a citizen of the United States, residing at Washington, in the District of Columbia, have invented certain new and useful Improvements in Electromagnetic Tachometers, of which the following is a specification.

This tachometer comprises an indicating instrument having an electromagnet wound and connected to provide a rotating magnetic field, and a rotor in inductive relation thereto, carrying a pointer and moving against the pressure of a spring, and a source of alternating, preferably polyphase current, driven or controlled by the wheel or shaft whose speed is to be measured.

Figure 1 is an axial section of the meter, on the line I—I of Fig. 2 and of a magneto giving three-phase current and adapted to be driven by a gear on the wheel or shaft of a vehicle; Fig. 2 is a horizontal section on the line II—II of Fig. 1; Fig. 3 is a horizontal section on the line III—III of Fig. 1; Fig. 4 is a side elevation of the rotor and electromagnetic-field members, separated; Fig. 5 is a plan view of the six-pole electromagnet, showing their windings connected for three-phase current; Fig. 6 is a vertical central section of commutating mechanism for converting direct battery current into three-phase alternating current, also driving an odometer and an electric contact-maker; and Fig. 7 is a developed plan of the commutator shown in Fig. 6.

The indicating instrument comprises a case 1 having a glass front 2 and a dial 3, graduated, *e. g.*, in miles per hour. Screwed to the bottom of the case is a disk 4, carrying a central tube 5 into which is screwed a plug 6 having a conical seat for the shaft 7 of the rotor. Secured to this disk are posts 8 which carry an upper plate 9 containing a jeweled bearing 10 for the upper end of the rotor-shaft.

Centrally supported in the case is the electromagnet 11, consisting of a series of superposed sheet-iron pieces providing six radial pole-pieces 12. Each pole-piece carries a winding 13 and the six windings are connected as shown in Fig. 5 to receive three-phase current through leads 14 and provide a rotating magnetic field. Surrounding and spaced away from the ends of the pole-pieces is an iron ring 15, flanged outward at right angles from a disk 16 having a sleeve 17 revolubly mounted on the tube 5. This ring has six openings 18, corresponding in size to and arranged slightly out of alinement with the pole-pieces 12. The ring serves as a path for the magnetic flux emanating from the pole-pieces, except where its continuity is interrupted by the openings 18. The reluctance of this path increases as the openings are brought more closely into alinement with the pole-pieces, by rotation of the ring. This fact is utilized to automatically compensate for the temperature-changes of resistance in the tachometer electric circuit, which comprises not only the electromagnet windings but also the instrument leads and the generator windings, or, alternatively, the commutator-brushes and segments and the battery. For this purpose, a bi-metallic strip 19 is adjustably secured at one end, by a slotted block and screws 20, to the disk 4, and its other end is secured to one end of a link 21, the other end of which is pivoted to a pin 22 projecting from the bottom of the disk 16. Variations in the temperature of the tachometer thereby cause the thermostatic strip 19 to shift the iron ring 15 and bring its openings 18 more or less closely into alinement with the pole-pieces 12, the increased resistance of the electric circuit at higher temperatures being thereby automatically compensated by the decreased reluctance of the iron path 15, due to the shifting of the openings 18 to a position farther out of alinement with the pole-pieces.

The size and position of the openings 18 must be so predetermined and the range of movement of the bimetallic strips 19 so adjusted for each instrument as to compensate for the temperature-changes in the tachometer circuit. Exact calibration of the speed-scale at different temperatures therefore requires the use of the particular leads and source of current which, or the duplicates of which, are to be used in the particular tachometer combination.

The rotor consists of an inverted cup 23, preferably of aluminum, fixed on the shaft 7, its depending flange extending between the pole-pieces 12 and the ring 15, being traversed by the magnetic flux. The upper end of this shaft carries a pointer 24 indicating speed on the dial 3. The torque of the rotor, urged in one direction by the inductive action of the rotating electromagnetic field, is opposed by the hair spring 25, one end of which is secured to the shaft 7 and the other end to the pin 26 projecting upward from the disk 9.

The generator shown in Fig. 1 comprises a water- and dust-proof case 27 in which is secured a field-magnet 28. The armature 29 has a three-phase winding the ends of which are carried out to the collector rings 30, upon which bear brushes connected to the leads 14 of the indicating instrument. The armature is driven, through fine-toothed gears 31 within the case, by a counter-shaft 32 having an external pinion 33 adapted to mesh with a gear on the wheel of an automobile, or to be otherwise driven by the rotating member whose speed is to be indicated.

The alternative source of three-phase current illustrated in Fig. 6 comprises a water- and dust-proof case 34, adapted to be mounted for example on the steering-knuckle of an automobile, in which is journaled a shaft 35 having an external pinion 36 adapted to mesh with a gear on the automobile-wheel. On this shaft is a commutator comprising an insulating drum 37 bearing two copper rings 38, 39, shown developed in Fig. 7. Two brushes 40, 41, connected to an electric battery 42 through a circuit including a push-button 43, bear on the outer peripherally-continuous portions of the rings 38, 39, respectively. Three intermediate brushes 44, 45, 46 are arranged to bear, at different times, on the peripherally-discontinuous portions of both rings, these rings being shaped and intermeshed as shown in Fig. 7 to convert the direct current of the battery into three-phase alternating current, which is likewise delivered to the leads 14 of the indicating instrument. An odometer 47 is mounted in the upper wall of the commutator case 34, being driven through gears 48, 49 by a worm 50 on the shaft 35. This worm also drives a lower pinion 51, the shaft of which carries a cam 52 adapted to intermittently press a contact-spring 53 against a fixed contact 54 and thereby close an external electric circuit, for example that of an electromagnetically-actuated odometer on the dash-board of the automobile. When commutated battery-current is thus used to produce the rotating magnetic field, the indicator responds only when the push-button 43 is pressed, thus minimizing the consumption of the current.

I claim:

1. A tachometer, comprising an electromagnetic member wound to provide a rotating magnetic field, an indicator member in inductive relation thereto, an armature having portions of different reluctance adjacent to the poles of said electromagnetic member, thermostatic means for shifting said armature and thereby varying the magnetic flux through said indicator member, and means for supplying alternating current to said electromagnetic member, including a member driven by the wheel or shaft whose speed is to be measured.

2. A tachometer, comprising an electromagnetic member wound to provide a rotating magnetic field, an indicator member in inductive relation thereto, means for varying the magnetic flux through said indicator member to compensate for temperature-changes of resistance in the circuit of said electromagnetic member, and means for supplying alternating current to said electromagnetic member, including a member driven by the wheel or shaft whose speed is to be measured.

3. A tachometer, comprising an electromagnetic member wound to provide a rotating magnetic field, an armature, an indicator member between said electromagnetic member and armature, means for varying the magnetic flux through said indicator member to compensate for temperature-changes of resistance in the circuit of said electromagnetic member, and means for supplying alternating current to said electromagnetic member, including a member driven by the wheel or shaft whose speed is to be measured.

4. A tachometer, comprising an electromagnetic member having polyphase windings, an armature, an indicator member between said electromagnetic member and armature, means for varying the magnetic flux through said indicator member to compensate for temperature-changes of resistance in the circuit of said electromagnetic member, and means for supplying polyphase current to said electromagnetic member, including a member driven by the wheel or shaft whose speed is to be measured.

5. A tachometer, comprising an electromagnetic system, an indicator member in inductive relation thereto, means for supplying alternating current to said system, including a member driven by the wheel or shaft whose speed is to be measured, a thermostat, and means controlled by said thermostat for compensating temperature-changes of resistance in the electric circuit of said tachometer.

6. In a tachometer, comprising an electromagnetic member wound to provide a rotating magnetic field, an armature, an indicator member between said electromagnetic member and armature, and means for supplying alternating current to said electromagnetic member, including a member driven by the wheel or shaft whose speed is to be measured, automatic means including a thermostat for compensating temperature-changes of resistance in the electric circuit of said tachometer.

7. In a tachometer, comprising an electromagnetic member wound to provide a rotating magnetic field, a movable armature having portions of different reluctance, an indicator member between said electromagnetic member and armature, and means for supply alternating current to said electromagnetic member, including a member driven by the wheel or shaft whose speed is to be measured, automatic means, including said armature and a thermostat adapted to shift said armature, for compensating temperature changes of resistance in the electric circuit of said tachometer.

8. A tachometer, comprising an indicator member and a winding or windings adapted to receive electric current and actuate said indicator member, means for supplying electric current to said winding or windings, including a member driven by the wheel or shaft whose speed is to be measured, a thermostat, and means controlled by said thermostat for compensating temperature-changes of resistance in the electric circuit of said tachometer.

In testimony whereof, I affix my signature in presence of two witnesses.

NEVIL MONROE HOPKINS.

Witnesses:
EUGENE A. BYRNES,
JOS. H. BLACKWOOD.